United States Patent
Marinsek et al.

(10) Patent No.: US 11,002,607 B2
(45) Date of Patent: May 11, 2021

(54) DIRECT MOUNTING OF FILTERS OR OTHER OPTICAL COMPONENTS TO OPTICAL DETECTORS USING FLEXURES

(71) Applicant: Raytheon Company, Waltham, MA (US)

(72) Inventors: Stephen Marinsek, Goleta, CA (US); Thomas P. Sprafke, Goleta, CA (US); Richard J. Peralta, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/371,717

(22) Filed: Apr. 1, 2019

(65) Prior Publication Data

US 2020/0309601 A1 Oct. 1, 2020

(51) Int. Cl.
*G01J 5/06* (2006.01)
*G01J 5/08* (2006.01)
*H04N 5/225* (2006.01)

(52) U.S. Cl.
CPC ............. *G01J 5/061* (2013.01); *G01J 5/084* (2013.01); *G01J 5/089* (2013.01); *H04N 5/2253* (2013.01); *H04N 5/2254* (2013.01); *G01J 2005/065* (2013.01)

(58) Field of Classification Search
CPC .. G01J 5/061; G01J 5/084; G01J 5/089; G01J 2005/065; H04N 5/2253; H04N 5/2254
See application file for complete search history.

(56) References Cited

U.S. PATENT DOCUMENTS

| 5,568,186 | A | 10/1996 | Althouse |
| 5,689,106 | A | 11/1997 | Dahlin |
| 5,734,156 | A | 3/1998 | Dahlin et al. |
| 5,801,891 | A | 9/1998 | Lloyd |
| 6,650,412 | B1 * | 11/2003 | Slater ................. G01J 3/02 356/328 |

(Continued)

FOREIGN PATENT DOCUMENTS

FR 2923009 A1 5/2009

OTHER PUBLICATIONS

Gluck et al., "Two-color imaging by the use of patterned optical filters bonded to focal-plane-array detectors," Applied Optics, vol. 35, No. 28, Oct. 1996, 4 pages.

(Continued)

*Primary Examiner* — David P Porta
*Assistant Examiner* — Mamadou Faye

(57) ABSTRACT

An apparatus includes an optical detector configured to detect at least a portion of incoming radiation. The apparatus also includes an optical component configured to provide at least the portion of the incoming radiation to the optical detector. The apparatus further includes at least one flexure that mounts the optical component to the optical detector. Each flexure is configured to deform in response to expansion or contraction of at least one of the optical component and the optical detector. Each flexure may include a side surface that is flexible in a first dimension and rigid in second and third dimensions, where the dimensions are orthogonal to each other. The optical component may include at least one of a filter, a lens, a polarizer, an aperture, and a cover.

23 Claims, 6 Drawing Sheets

(56) References Cited

U.S. PATENT DOCUMENTS

| | | | |
|---|---|---|---|
| 9,157,806 B2 | 10/2015 | Yaacobi | |
| 9,228,894 B2 | 1/2016 | Sprafke | |
| 9,664,562 B1 | 5/2017 | Goodnough et al. | |
| 2012/0092655 A1* | 4/2012 | Dozor | G02B 21/33 356/237.2 |
| 2014/0350395 A1* | 11/2014 | Shachaf | A61B 5/0082 600/431 |
| 2015/0382466 A1 | 12/2015 | Boltanski | |
| 2017/0205281 A1* | 7/2017 | Cassaigne | G01J 5/04 |
| 2019/0356058 A1* | 11/2019 | Martin | H01Q 15/006 |
| 2020/0243577 A1* | 7/2020 | Pei | H01L 31/107 |

OTHER PUBLICATIONS

Kvamme et al., "Mounting of large lithium fluoride space-based optics," NIRCam Instrument Presentation 5877-33, Lockheed Martin Advanced Technology Center, Feb. 2019, 11 pages.

Pollard, "Design of a Flexure Mount for Optics in Dynamic and Cryogenic Environments," NASA Contractor Report 177495, National Aeronautics and Space Administration, Feb. 1989, 136 pages.

International Search Report and Written Opinion of the International Searching Authority in connection with International Patent Application No. PCT/US2019/066529 dated Apr. 7, 2020, 12 pages.

\* cited by examiner

DIRECT MOUNTING OF FILTERS OR OTHER OPTICAL COMPONENTS TO OPTICAL DETECTORS USING FLEXURES

TECHNICAL FIELD

This disclosure relates generally to optical detection systems. More specifically, this disclosure relates to direct mounting of filters or other optical components to optical detectors using flexures.

BACKGROUND

Cooled infrared (IR) cameras typically cannot operate effectively until various components of the cameras (such as their optical detectors, optical filters, apertures, and stray light reduction features) reach cryogenic temperatures. For example, an infrared camera may need to be cooled to cryogenic temperatures in order for its optical detector to properly image a scene and meet any associated noise requirements. In some applications, infrared cameras may need to reach cryogenic temperatures in a very short amount of time. Thus, those infrared cameras may have very little time to reach cryogenic temperatures before the infrared cameras need to be placed into operation.

SUMMARY

This disclosure provides direct mounting of filters or other optical components to optical detectors using flexures.

In a first embodiment, an apparatus includes an optical detector configured to detect at least a portion of incoming radiation. The apparatus also includes an optical component configured to provide at least the portion of the incoming radiation to the optical detector. The apparatus further includes at least one flexure that mounts the optical component to the optical detector. Each flexure is configured to deform in response to expansion or contraction of at least one of the optical component and the optical detector.

In a second embodiment, a system includes an optical detector configured to detect at least a portion of incoming radiation and an optical component configured to provide at least the portion of the incoming radiation to the optical detector. The system also includes at least one flexure that mounts the optical component to the optical detector, where each flexure is configured to deform in response to expansion or contraction of at least one of the optical component and the optical detector. The system further includes a cold shield positioned around the optical detector and the optical component, where the cold shield includes an aperture through which the incoming radiation passes. In addition, the system includes a platform on which the cold shield is mounted and a cold finger contacting the platform. The cold finger is configured to be cooled in order to remove heat from the platform and thereby cool the optical detector, the optical component, and the cold shield.

In a third embodiment, a method includes mounting an optical component to an optical detector using at least one flexure. The optical detector is configured to detect at least a portion of incoming radiation, and the optical component is configured to provide at least the portion of the incoming radiation to the optical detector. Each flexure is configured to deform in response to expansion or contraction of at least one of the optical component and the optical detector.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
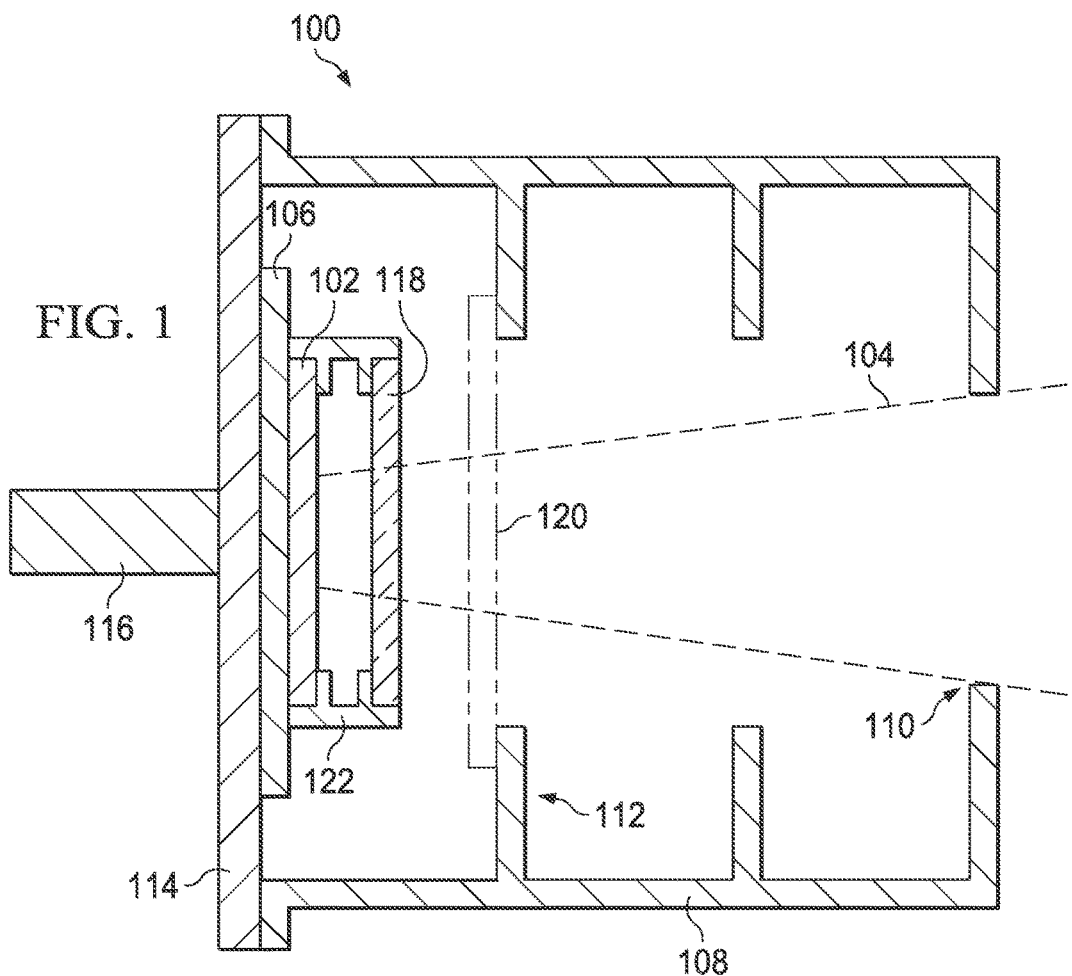
FIG. 1 illustrates an example optical detection system according to this disclosure.

FIGS. 1 through 11, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, cooled infrared (IR) cameras typically cannot operate effectively until various components of the cameras reach cryogenic temperatures. In some applications, infrared cameras may need to reach cryogenic temperatures in a very short amount of time. From an engineering perspective, the need for fast cooldown times of infrared cameras or other optical detection systems can be a very difficult and challenging problem to resolve effectively and efficiently.

One prior approach for configuring infrared cameras involved mounting a large optical filter away from an optical detector within a cold shield, where the cold shield defined an aperture for the optical detector and reduced stray light reaching the optical detector. Unfortunately, the optical detector here typically cannot be used until all of these components reach cryogenic temperatures. The positioning of the optical filter away from the optical detector typically creates a long thermal path for heat from the optical filter. In other words, the heat from the optical filter often needs to travel relatively long distances in order to be removed from an overall structure, which increases the length of time needed for the overall structure to reach suitable cryogenic temperatures. Also, because the size of the optical filter typically increases as its mounting distance from the optical detector increases, a large amount of mass typically needs to be cooled, which again increases the length of time needed for the overall structure to reach suitable cryogenic temperatures.

Other prior approaches for configuring infrared cameras involved using an adhesive or indium deposition to directly bond an optical filter to an optical detector. However, optical filters and optical detectors often have different coefficients of thermal expansion (CTEs), which means that the optical filters and the optical detectors expand or contract differently in response to changes in temperature. As a result, connections between an optical detector and other components can experience large amounts of stress as components change size over the expected range of temperatures. This stress can reduce the operational lifespan of the optical detector or an overall system.

This disclosure provides techniques for directly mounting one or more filters or other optical components to an optical detector using various flexible mounts or "flexures." By mounting one or more filters or other optical components directly on an optical detector, the filter(s) or other component(s) can be smaller (compared to filters or other optical components mounted farther away from optical detectors). As a result, this reduces the amount of mass to be cooled, which decreases the length of time needed for an overall structure to reach suitable cryogenic or other temperatures. Also, the thermal path for heat from one or more filters or other optical components mounted directly to an optical detector can be shorter (compared to filters or other optical components mounted farther away from optical detectors). As a result, this reduces the length of the thermal path for heat and improves thermal conductivity, which again decreases the length of time needed for the overall structure to reach suitable cryogenic or other temperatures.

Moreover, the flexures used here are flexible and are therefore able to deform during use. Thus, the use of the flexures helps to compensate for CTE differences or mismatches between an optical detector and one or more filters or other optical components being mounted to the optical detector using the flexures. In some cases, the flexures can be oriented such that the flexures are rigid when an overall assembly is subjected to external forces but flexible to accommodate CTE mismatches between components. The ability to accommodate CTE mismatches can help to reduce stresses on the optical detector and preserve or increase the operational lifespan of the optical detector or an overall system. In addition, in some cases, the flexures can support the use of multiple filters or other optical components with an optical detector, and/or the flexures can be used to set the tip/tilt of one or more filters or other optical components used with an optical detector. As a result, the flexures can be used in various ways to effectively mount optical components to optical detectors.

FIG. 1 illustrates an example optical detection system 100 according to this disclosure. As shown in FIG. 1, the optical detection system 100 includes an optical detector 102, which generally operates to receive incoming radiation 104 and convert the radiation 104 into corresponding electrical signals or other signals that can be processed further. For example, the optical detector 102 may receive incoming radiation 104 from a scene and generate signals representing one or more images of the scene based on the incoming radiation 104. The optical detector 102 includes any suitable structure configured to receive and detect incoming radiation 104. In some embodiments, the optical detector 102 may be formed using a focal plane array or other array of photodetectors or other optical detection elements, such as optical detection elements arranged in rows and columns. Each optical detection element is typically configured to image or measure radiation in a small portion of a scene. In particular embodiments, the optical detector 102 represents an infrared camera, although other types of cameras or optical detectors may be used.

In this example, the optical detector 102 is mounted on or otherwise electrically coupled to a read-out integrated circuit (ROIC) 106. The read-out integrated circuit 106 generally operates to receive signals generated by the optical detector 102 and to provide those signals to one or more other components for processing. The read-out integrated circuit 106 may also accumulate signals generated by the optical detector 102 and provide those accumulated signals to one or more other components for processing. For example, the read-out integrated circuit 106 may receive electrical signals generated by different photodetectors or other optical detection elements of the optical detector 102 and provide those signals (or accumulated versions of those signals) to one or more analog-to-digital converters (ADCs), signal processors, or other components for processing. The read-out integrated circuit 106 may further multiplex the signals or accumulated signals so that the other component(s) can obtain the signals or accumulated signals over a smaller number of signal lines. The read-out integrated circuit 106 includes any suitable structure configured to receive signals from an optical detector 102 and to output those signals or some other version of those signals. Note, however, that the read-out integrated circuit 106 may be optional if the optical detector 102 can provide signals directly to one or more other components that process the signals.

A cold shield 108 can be positioned around the optical detector 102. The cold shield 108 represents a structure that defines an aperture 110 through which the incoming radiation 104 is received by the optical detector 102. One or more outer surfaces of the cold shield 108 may be reflective at the wavelength or wavelengths sensed by the optical detector 102, and one or more inner surfaces of the cold shield 108 may be absorptive at the wavelength or wavelengths sensed by the optical detector 102. This helps to ensure that the optical detector 102 receives little or no stray radiation. In this example, the cold shield 108 also includes one or more baffles 112, which can extend into the interior space of the cold shield 108 and block stray radiation from the optical detector 102. The number and arrangement of the baffles 112 shown in FIG. 1 are for illustration only and can vary as needed or desired.

The cold shield 108 can be formed from any suitable material(s), such as one or more metals. As a particular example, the cold shield 108 may be formed from aluminum. One or more outer surfaces of the cold shield 108 may be highly reflective, such as when coated using electrodeposited gold or other reflective material(s). One or more inner surfaces of the cold shield 108 may be highly absorptive, such as when coated using a black infrared-absorbing material. The cold shield 108 can also be formed in any suitable manner, such as by using metal forming, injection molding, machining, or additive manufacturing operations. In addition, the cold shield 108 and each of its individual components can have any suitable size, shape, and dimensions.

In this example, the read-out integrated circuit 106 and the cold shield 108 are mounted on a platform 114. The platform 114 represents any suitable structure configured to support or carry other components of the optical detection system 100. The platform 114 may also allow electrical or other signals from the read-out integrated circuit 106 to pass along or through the platform 114 for delivery to one or more analog-to-digital converters, signal processors, or other components for processing. The platform 114 can be formed from any suitable material(s), such as ceramic. The platform 114 can also be formed in any suitable manner and can have any suitable size, shape, and dimensions.

In order to cool the optical detection system 100 to cryogenic temperatures or other temperatures, a cold finger 116 contacts the platform 114. The cold finger 116 generally represents a portion of a cryogenic cooler (cryocooler) or other cooling system that operates to cool the cold finger 116 to cryogenic or other temperatures. Since the cold finger 116 contacts the platform 114, the cold finger 116 can be used to remove heat from the platform 114, thereby helping to remove heat from the optical detector 102, read-out integrated circuit 106, and cold shield 108 coupled to the platform 114. In this way, the cold finger 116 may be used to cool these components to cryogenic or other temperatures at which the optical detection system 100 is designed to operate. The cold finger 116 includes any suitable structure configured to be cooled and to remove heat from an optical detection system 100.

In addition, the optical detection system 100 includes at least one optical component 118 mounted directly on the optical detector 102. Each optical component 118 provides or allows passage of at least some of the incoming radiation 104 to the optical detector 102 and may process or alter the incoming radiation 104 in some manner. Each optical component 118 represents any suitable optical component designed to provide desired functionality to support the use of the optical detector 102. For example, an optical component 118 may represent an optical filter configured to permit passage of incoming radiation 104 only at one or more desired wavelengths or in one or more desired wavelength bands. As a particular example, when used with an infrared camera, an optical component 118 may represent a cold filter, which operates to block all radiation except radiation in a small band of infrared wavelengths. Note, however, that any other or additional types of optical components 118 can be used here, such as one or more lenses, polarizers, apertures, or protective covers.

As noted above, one prior approach involved mounting an optical filter away from an optical detector within a cold shield. An example position of such an optical filter is shown in FIG. 1 at a position 120. However, in order to cool an optical filter at that position 120, heat from the optical filter would need to pass through one or more baffles 112 to sides of the cold shield 108, through the sides of the cold shield 108 to the platform 114, and through most of the platform 114 to the cold finger 116. Also, in order to secure an optical filter to the baffles 112 at that position 120 while providing an adequate opening for incoming radiation 104 to reach the optical detector 102, the optical filter at the position 120 is generally bigger than the optical detector 102 (possibly by quite a large amount). As a result, this approach involved long thermal paths and large masses to be cooled. Other prior approaches involved directly bonding an optical filter to an optical detector. However, the optical detector 102, platform 114, and optical component(s) 118 in FIG. 1 often have different coefficients of thermal expansion (CTEs), so these components can expand or contract differently in response to changes in temperature. Directly bonding an optical filter to the optical detector 102 may create large amounts of stress on the optical detector 102 or other components of the optical detection system 100.

In accordance with this disclosure, one or more flexures 122 are used to mount one or more optical components 118 directly to the optical detector 102. Each flexure 122 is generally configured to be coupled to an optical detector 102 and one or more optical components 118 being mounted to the optical detector 102. Each flexure 122 is also configured to flex or otherwise deform in order to accommodate different expansions/contractions of the optical detector 102 and the one or more optical components 118 caused by CTE mismatches.

Because one or more filters or other optical components 118 can be mounted directly on the optical detector 102, the component(s) 118 can be smaller compared to filters or other optical components mounted at the position 120 or otherwise farther away from the optical detector 102. Also, the thermal path for heat from the one or more filters or other optical components 118 can be shorter compared to filters or other optical components mounted at the position 120 or otherwise farther away from the optical detector 102. This is because the thermal path for the component(s) 118 shown in FIG. 1 now goes through the flexures 122, optical detector 102, and read-out integrated circuit 106 to the platform 114 and then through a small portion of the platform 114 to the cold finger 116. The use of the flexures 122 therefore helps to reduce the total mass to be cooled and the length of the thermal path for heat. This helps to improve thermal conductivity and decrease the length of time needed for the optical detection system 100 to reach suitable cryogenic or other temperatures. In addition, as described in more detail below, the flexures 122 can be more flexible in one direction while being more rigid in other directions. This allows the flexures 122 to be used to accommodate CTE differences while maintaining rigidity when the optical detection system 100 encounters mechanical shock or vibration.

Each flexure 122 can be formed from any suitable material(s). For example, each flexure 122 may be formed using one or more metals or other thermally-conductive materials that can deform across a thinner dimension and that can provide rigidity across thicker dimensions. Specific examples of the materials that can form the flexures 122 include aluminum, copper, nickel, and alloys thereof. The specific material or materials to be used for the flexures 122 can be selected based on various factors, such as the amount of heat to be transported through the flexures 122 and the amount of flex that the flexures 122 will need to provide. Also, each flexure 122 can be formed in any suitable manner, such as metal forming, injection molding, machining, or additive manufacturing operations. In addition, each flexure 122 can have any suitable size shape and dimensions.

Each flexure 122 is coupled to the optical detector 102 and the component(s) 118 in any suitable manner. For example, each flexure 122 can be coupled to the optical detector 102 and the component(s) 118 using an adhesive, such as epoxy or glue. However, any other suitable techniques can be used to attach or otherwise secure the optical detector 102 and the component(s) 118 to the flexures 122.

The flexures 122 can be used in any suitable applications to couple any suitable optical component(s) 118 to an optical detector 102. For example, the flexures 122 may be used to couple focal plane arrays or other optical detectors 102 to pan-band, multi-spectral, hyperspectral, or other optics or other optical components 118 used in commercial, civil, defense, and national electro-optical sensing applications. The applications can include applications in the terrestrial and space domains.

Although FIG. 1 illustrates one example of an optical detection system 100, various changes may be made to FIG. 1. For example, the optical detection system 100 in FIG. 1 has been simplified for ease of illustration and explanation. The optical detection system 100 may include any number of other or additional components supporting image capture or detection. Also, the exact form of the flexures 122 shown in FIG. 1 can vary as needed or desired, and example (non-limiting) forms for the flexures 122 are described below.

Figure 2:
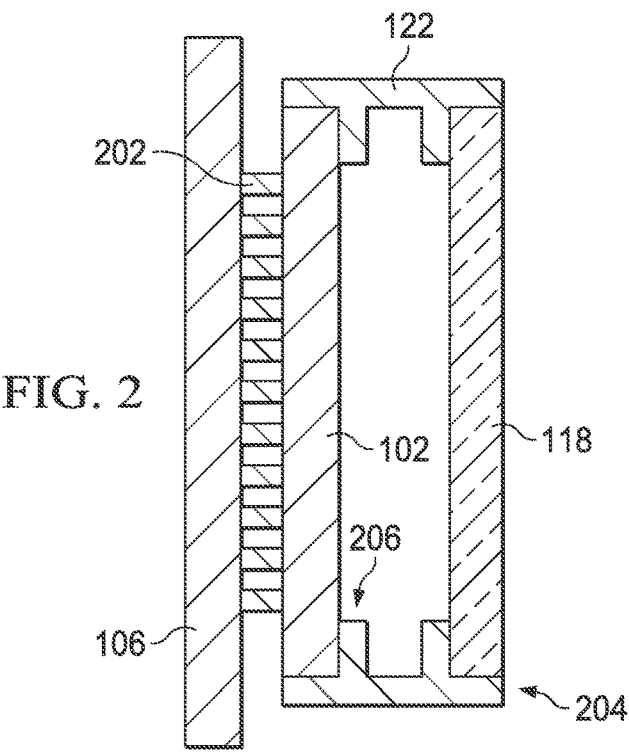
FIGS. 2 and 3 illustrate an example of direct mounting of a filter or other optical component on an optical detector using flexures according to this disclosure.
Figure 3:
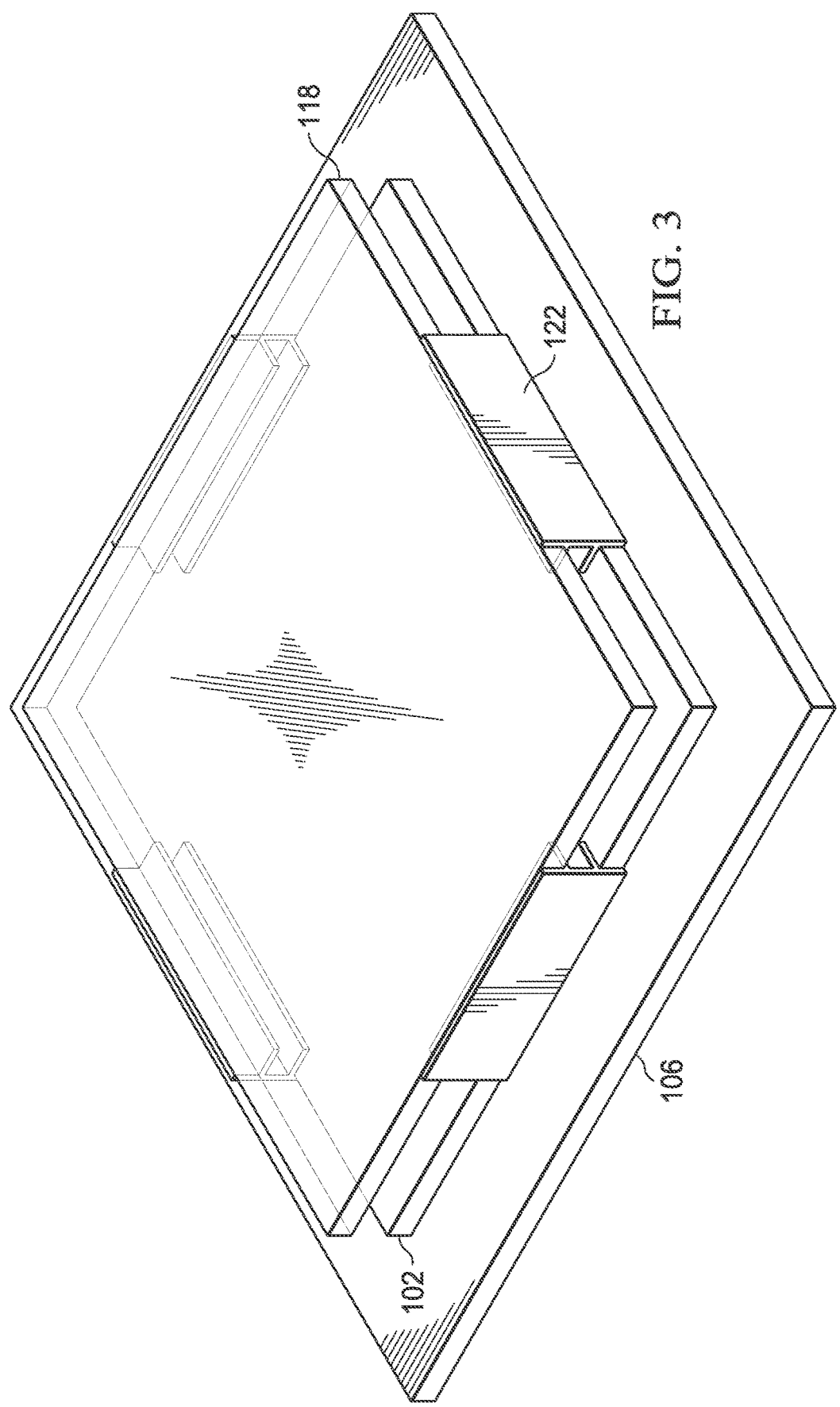

FIGS. 2 and 3 illustrate an example of direct mounting of a filter or other optical component on an optical detector using flexures 122 according to this disclosure. For ease of explanation, the flexures 122 shown in FIGS. 2 and 3 are described as being used to mount an optical component 118 to the optical detector 102 of FIG. 1. However, one or more flexures 122 may be used to mount any suitable optical component or components to any suitable optical detector in any suitable optical detection system or other system.

In FIG. 2, the optical detector 102 is shown as being coupled to the read-out integrated circuit 106 using various conductive interconnects 202. The interconnects 202 support the communication of electrical signals between the optical detector 102 and the read-out integrated circuit 106. The interconnects 202 can be formed from any suitable material(s) and in any suitable manner. For instance, the interconnects 202 can be formed as conductive bumps or other conductive structures using one or more conductive metals or other conductive materials. Note that the size of the interconnects 202 has been exaggerated in FIG. 2 and that the interconnects 202 can have any suitable size, shape, and arrangement. Also note that the number of interconnects 202 can vary as needed or desired.

As shown in FIG. 2, the flexures 122 here are used to mount a single optical component 118 (such as a cold filter or other optical filter) to the optical detector 102. The optical component 118 is maintained in spaced relation to the optical detector 102 by the flexures 122, meaning the flexures 122 hold the optical component 118 away from the optical detector 102. Of course, the spacing between the optical detector 102 and the optical component 118 can vary as needed or desired.

In this particular example, each flexure 122 generally includes a side surface 204 and multiple arms 206 projecting inward from the side surface 204. Each of the optical detector 102 and the optical component 118 can be secured to the side surface 204 and/or one of the arms 206, such as by using an adhesive. The arms 206 help to hold the optical detector 102 and the optical component 118 apart in order to obtain a desired spacing. As noted below, however, this form of the flexures 122 is an example only, and each flexure 122 can have other designs.

As shown in FIG. 3, the optical component 118 is mounted directly to the optical detector 102 in this example using four flexures 122. In this particular example, each flexure 122 is centered along one side of the optical component 118 and along one side of the optical detector 102. Also, in this particular example, a single flexure 122 is positioned along each side of the optical component 118 and along each side of the optical detector 102. However, any other suitable number and arrangement of flexures 122 can be used here. For instance, multiple flexures 122 may be positioned along each side of the optical component 118 and each side of the optical detector 102, and those flexures 122 can be smaller, larger, or have the same size as the flexures 122 shown in FIG. 3. As another example, one flexure 122 may extend substantially along each side of the optical component 118 and each side of the optical detector 102. As yet another example, multiple flexures 122 may be positioned along each side of the optical component 118 and each side of the optical detector 102 at the corners of the optical component 118 and the optical detector 102. In general, the arrangement of flexures 122 can extend partially or completely around the optical component 118 being mounted to the optical detector 102.

Although FIGS. 2 and 3 illustrate one example of a direct mounting of a filter or other optical component 118 on an optical detector 102 using flexures 122, various changes may be made to FIGS. 2 and 3. For example, the sizes, shapes, and dimensions of the various components shown in FIGS. 2 and 3 are for illustration only. Also, the exact form of the flexures 122 shown in FIGS. 2 and 3 can vary, and other example (non-limiting) designs for the flexures 122 are described below.

Figure 4:
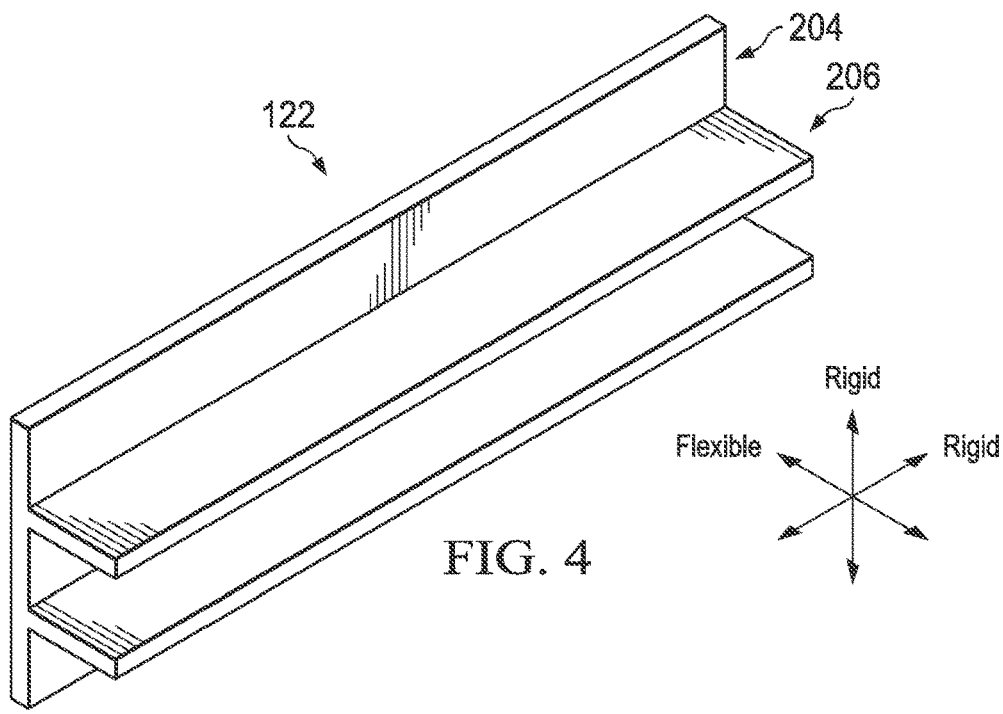
FIG. 4 illustrates an example flexure for use in directly mounting a filter or other optical component on an optical detector according to this disclosure.

FIG. 4 illustrates an example flexure 122 for use in directly mounting a filter or other optical component on an optical detector according to this disclosure. For ease of explanation, the flexure 122 shown in FIG. 4 is described as being used to mount an optical component 118 to the optical detector 102 of FIG. 1. However, the flexure 122 shown in FIG. 4 may be used to mount any suitable optical component or components to any suitable optical detector in any suitable optical detection system or other system.

As shown in FIG. 4, the flexure 122 here includes the side surface 204 and the arms 206 projecting from the side surface 204. In this example, the side surface 204 represents a generally planar and generally rectangular surface. In this type of configuration, the flexure 122 is generally flexible in only one of three orthogonal dimensions. The flexure 122 is flexible in the flexible dimension because the side surface 204 is thinnest in this dimension (meaning this is the smallest dimension of the side surface 204), which allows the side surface 204 to deform more easily. In the other two more rigid dimensions, the side surface 204 is thicker (meaning these are the larger dimensions of the side surface 204), and the side surface 204 cannot deform as easily in those dimensions.

This type of structure allows the flexure 122 to deform much more easily in its flexible dimension while resisting deformation in its more rigid dimensions. As a result, the flexure 122 can deform more easily to accommodate CTE mismatches between the optical detector 102 and the optical component 118, and the flexure 122 can resist deformation in response to mechanical shock or vibration. It should be noted, however, that these types of benefits can be obtained using other shapes for the side surface 204. There is no requirement here that the side surface 204 be rectangular or planar.

Each arm 206 projecting from the side surface 204 here also represents a generally planar and generally rectangular surface. These arms 206 allow the optical detector 102 and the optical component 118 to be nested into corners of the flexure 122 created by the side surface 204 and the arms 206. These arms 206 also allow the flexure 122 to be placed against planar surfaces of the optical detector 102 and the optical component 118. Adhesive or other mechanisms can be used to secure the optical detector 102 and the optical component 118 to the side surface 204 and/or the arms 206 of the flexure 122. Note, however, that the arms 206 may take other forms allowing the flexure 122 to contact and be coupled to the optical detector 102 and the optical component 118. For instance, there is no requirement that the arms 206 be continuous or extend completely across the side surface 204. One or more arms 206 may extend partially across the side surface 204, or one or more arms 206 may be formed from discontinuous segments that extend partially or completely across the side surface 204.

Although FIG. 4 illustrates one example of a flexure 122 for use in directly mounting a filter or other optical component 118 on an optical detector 102, various changes may be made to FIG. 4. For example, the sizes, shapes, and dimensions of the various components shown in FIG. 4 are for illustration only. Also, the exact form of the flexure 122 can vary, and other example (non-limiting) designs for the flexures 122 are described below.

Figure 5:
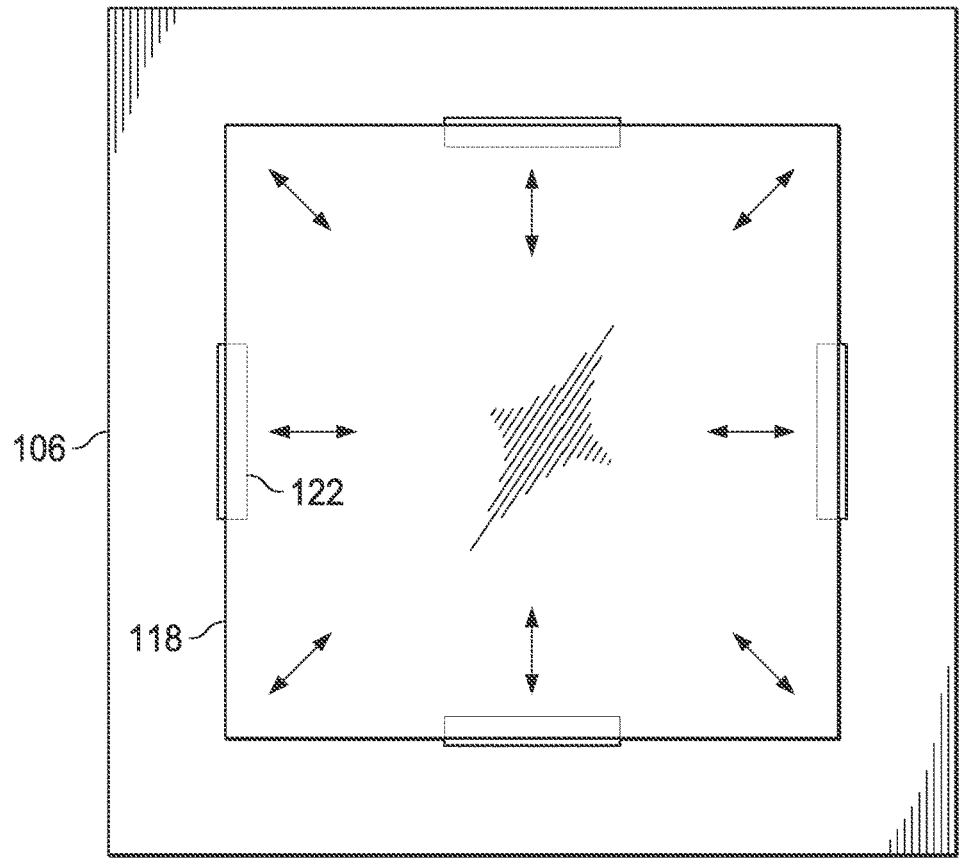
FIGS. 5 through 7 illustrate an example use of a flexure in directly mounting a filter or other optical component on an optical detector according to this disclosure.
Figure 6:
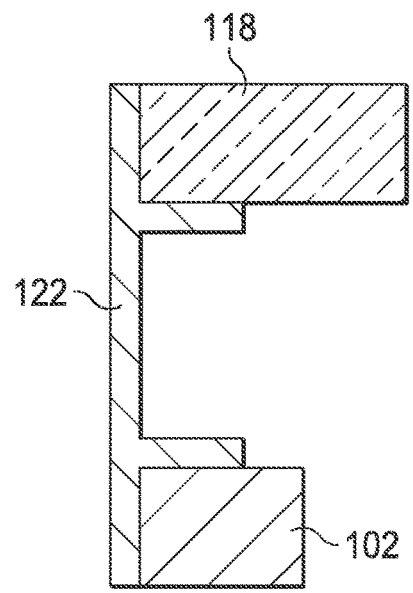
Figure 7:
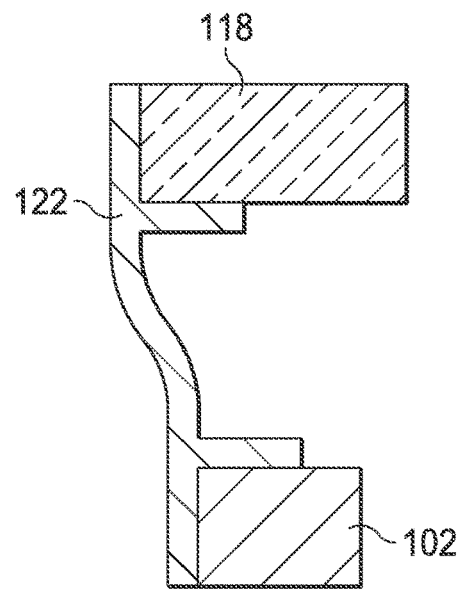

FIGS. 5 through 7 illustrate an example use of a flexure 122 in directly mounting a filter or other optical component on an optical detector according to this disclosure. For ease of explanation, the flexures 122 shown in FIGS. 5 through 7 are described as being used to mount an optical component 118 to the optical detector 102 of FIG. 1. However, the flexure 122 shown in FIGS. 5 through 7 may be used to mount any suitable optical component or components to any suitable optical detector in any suitable optical detection system or other system.

As shown in FIG. 5, the component 118 is shown as being mounted over and obscuring the optical detector 102. Bidirectional arrows in FIG. 5 represent possible expansion and contraction of the component 118, which may be caused by changes in the temperature of the component 118. The optical detector 102 may also experience expansion and contraction caused by changes in the temperature of the optical detector 102. However, the expansion and contraction of the optical component 118 often does not match the expansion and contraction of the optical detector 102. As noted above, these differences in expansion and contraction are caused by CTE mismatches between the optical detector 102 and the optical component 118. These CTE mismatches can lead to stresses on components of the optical detection system 100.

The use of the flexures 122 here helps to alleviate these types of problems in the optical detection system 100. For example, FIG. 6 illustrates a portion of the optical detector 102 and a portion of the optical component 118, which are coupled here by one of the flexures 122. The flexure 122 in FIG. 6 has the same general shape as shown in FIG. 4, which may represent the shape of the flexure 122 when the optical component 118 is actually mounted to the optical detector 102. FIG. 7 illustrates the same portions of the optical detector 102 and the optical component 118, which are coupled here by the same flexure 122. However, the flexure 122 in FIG. 7 has deformed, which can be caused by different expansions and/or contractions of the optical component 118 and the optical detector 102. The flexibility provided by the flexure 122 helps to accommodate these differences in expansion or contraction without causing excessive stress on the optical detector 102.

Although FIGS. 5 through 7 illustrate one example of a use of a flexure 122 in directly mounting a filter or other optical component 118 on an optical detector 102, various changes may be made to FIGS. 5 through 7. For example, while deformation of the top portion of the flexure 122 outward and/or deformation of the bottom portion of the flexure 122 inward is shown in FIG. 7, each flexure 122 can deform in other ways to accommodate other changes in shape. As a particular example, the top portion of the flexure 122 in FIG. 7 may deform inward and/or the bottom portion of the flexure 122 in FIG. 7 may deform outward.

Figure 8:
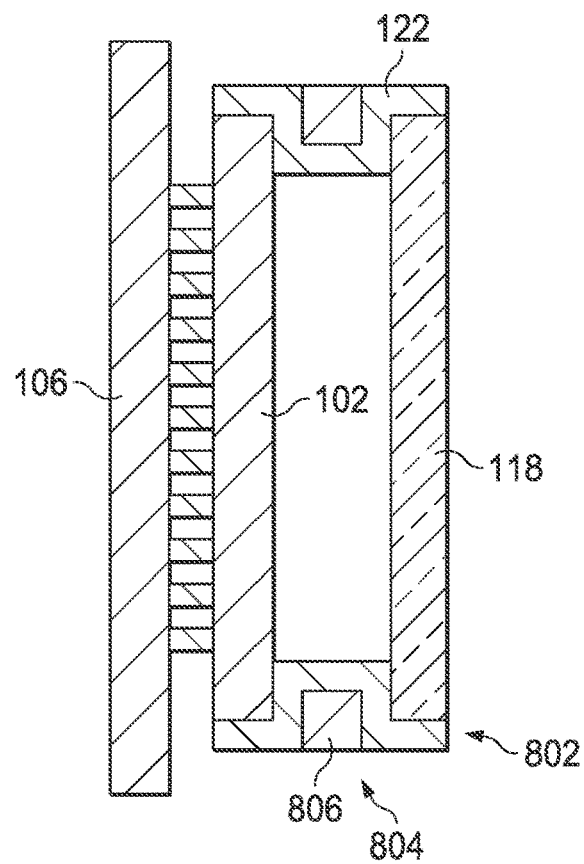
FIGS. 8 through 10 illustrate other example flexures for use in directly mounting one or more filters or other optical components on an optical detector according to this disclosure.
Figure 9:
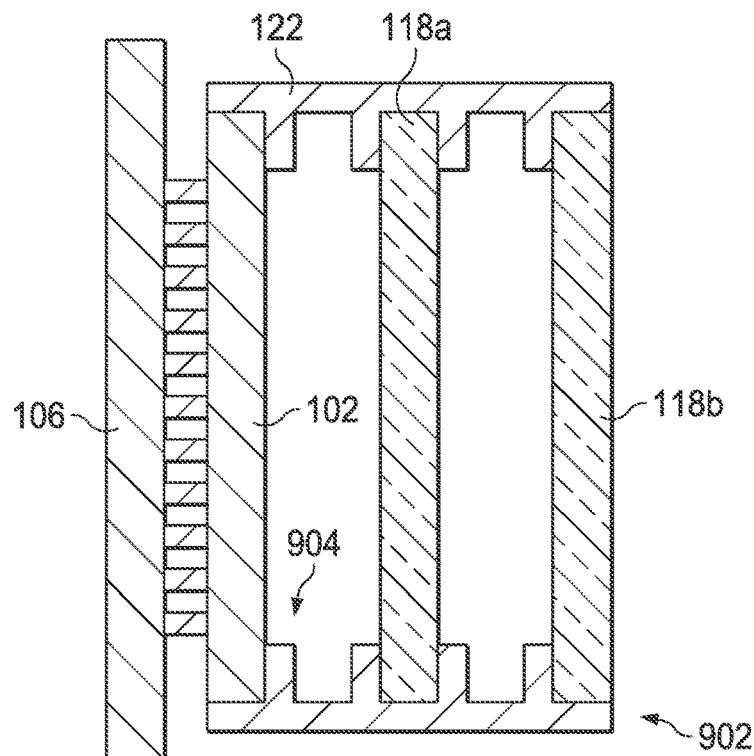
Figure 10:
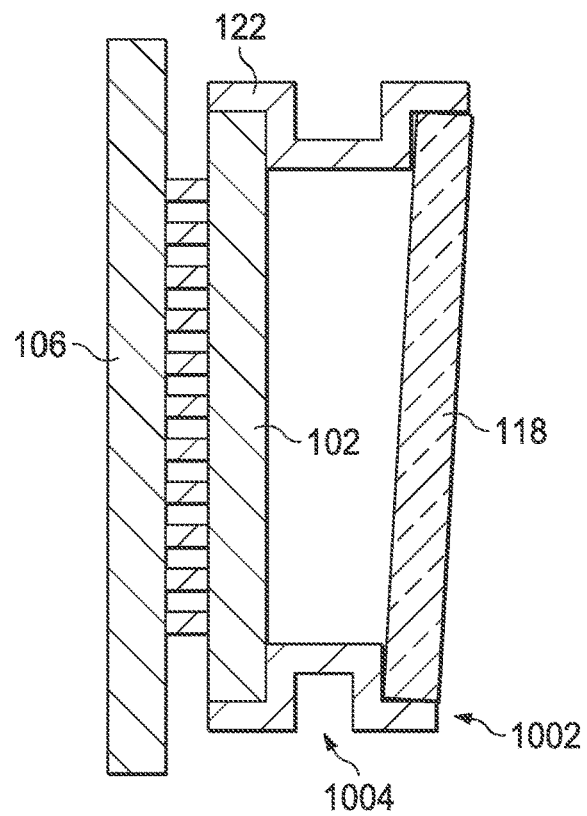

FIGS. 8 through 10 illustrate other example flexures 122 for use in directly mounting one or more filters or other optical components on an optical detector according to this disclosure. For ease of explanation, the flexures 122 shown in FIGS. 8 through 10 are described as being used to mount an optical component 118 to the optical detector 102 of FIG. 1. However, the flexures 122 shown in FIGS. 8 through 10 may be used to mount any suitable optical component or components to any suitable optical detector in any suitable optical detection system or other system.

As shown in FIG. 8, rather than using distinct arms, each flexure 122 may include a side surface 802 that itself projects inward at a desired location in order to provide shelves or other surfaces that can contact the optical detector 102 and the optical component 118. Here, the side surface 802 in each flexure 122 assumes the role of the arms 206 described above. In some embodiments, at least one notch 804 can be formed in the outer face of the side surface 802, such as when a notch 804 is created by the inward movement of the side surface 802 at that location. Also, in some embodiments, at least one notch 804 can be partially or completely filled with a thermally-conductive material 806, such as a thermally-conductive adhesive. The use of a thermally-conductive material 806 in a notch 804 can help to promote faster heat transfer from the optical component 118 to the optical detector 102 (and eventually to the cold finger 116) through the flexure 122. However, the use of a thermally-conductive material 806 in a notch 804 is not required.

As shown in FIG. 9, each flexure 122 may be used to mount multiple optical components 118a-118b to the optical detector 102. In this example, each flexure 122 includes a wider side surface 902 and more numerous arms 904 projecting inward from the side surface 902 (compared to the side surface 204 and arms 206 in FIG. 4). The arms 904 here are used to maintain separation of the optical detector 102 from the optical component 118a and to maintain separation of the optical component 118a from the optical component 118b.

In the example shown in FIG. 9, the flexures 122 allow for the use of multiple filters or other optical components 118a-118b in close proximity to one another. The optical components 118a-118b here can be formed from the same material(s) or from different materials. The optical components 118a-118b can also have different coefficients of thermal expansion from each other as well as from the optical detector 102. Thus, the flexures 122 in FIG. 9 can accommodate for different expansions or contractions caused by CTE mismatches involving the optical detector 102 and all of the optical components 118a-118b.

It should be noted here that while the spacing between the optical detector 102 and the optical component 118a appears to be the same as or similar to the spacing between the optical components 118a-118b, this need not be the case, and non-uniform spacings may be supported by the flexures 122. It should also be noted here that while two optical components 118a-118b are mounted to the optical detector 102 here, more than two optical components can be mounted to the optical detector 102. It should further be noted here that the same type of form for the flexures 122 shown in FIG. 8 may be used in FIG. 9. In those embodiments, the side surfaces 902 in FIG. 9 may project inward at desired locations to provide shelves or other surfaces that can contact the optical detector 102 and the optical components 118a-118b (and the notches 804 and thermally-conductive material 806 may or may not be used here). In those embodiments, the arms 904 may be omitted from the flexures 122. It is also possible to combine these designs, where arms 904 are used in some locations and inward projections of the side surfaces 902 are used in other locations.

As shown in FIG. 10, each flexure 122 may include a side surface 1002 that projects inward at a desired location to provide shelves or other surfaces that can contact the optical detector 102 and the optical component 118. Again, the side surfaces 1002 themselves assume the role of the arms 206, 904 described above. In some embodiments, at least one notch 1004 can optionally be formed in the outer face of each side surface 1002, and (if present) at least one notch 1004 can optionally be filled partially or completely with a thermally-conductive material, such as a conductive adhesive. It should be noted, however, that the use of inward projections is not required in FIG. 10 and that arms 206, 904 may be used in FIG. 10.

In the example shown in FIG. 10, different flexures 122 have different sizes. In this particular example, the different sizes of the flexures 122 are achieved by having flexures 122 of different overall lengths, where longer flexures 122 can have larger notches 1004. However, different flexures 122 may have any other suitable characteristics that differ, such as when longer flexures 122 have arms 206, 904 at different positions along the flexures 122.

Using flexures 122 of different sizes or other different designs allows at least one optical component 118 to be mounted with a desired tip or tilt compared to the optical detector 102. This tip or tilt angle can be used to achieve various purposes, such as to reduce reflections received by the optical detector 102 from one or more targets or areas of interest or to resist countermeasures employed against the optical detection system 100 or a larger device or system.

Although FIGS. 8 through 10 illustrate other examples of flexures 122 for use in directly mounting one or more filters or other optical components 118 on an optical detector 102, various changes may be made to FIGS. 8 through 10. For example, one or more features of the flexures 122 shown in at least one of the figures described above may be used in the flexures 122 of other figures described above. As a result, a flexure 122 may include any suitable combination of features shown in the figures or described above, whether or not that particular combination of features is shown in the figures. As a particular example, the flexure 122 shown in FIG. 10 may be used to mount multiple optical components 118a-118b to the optical detector 102. As another particular example, notches may be used in flexures 122 having arms 206, 904.

Figure 11:
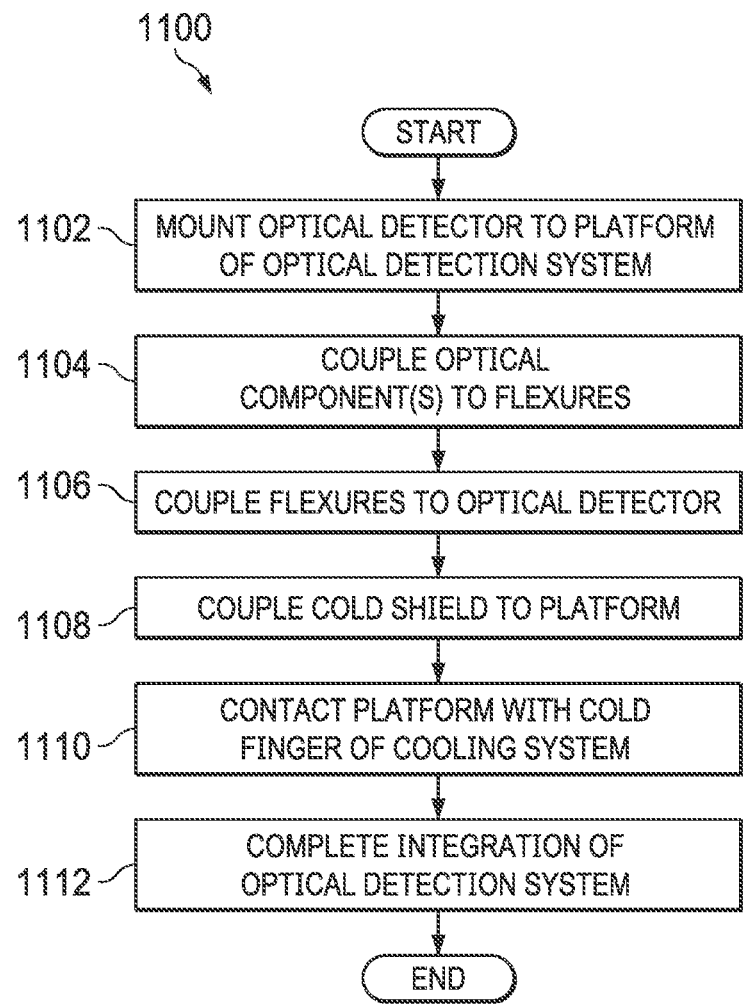
FIG. 11 illustrates an example method for directly mounting one or more filters or other optical components to an optical detector using flexures according to this disclosure.

FIG. 11 illustrates an example method 1100 for directly mounting one or more filters or other optical components to an optical detector using flexures according to this disclosure. For ease of explanation, the method 1100 is described as involving the use of one or more flexures 122 to mount at least one optical component 118 to an optical detector 102. However, the method 1100 may involve the use of any suitable flexure to mount any suitable component or components on any suitable optical detector in any suitable optical detection system or other system.

As shown in FIG. 11, an optical detector is mounted to a platform of an optical detection system at step 1102. This may include, for example, mounting an optical detector 102 onto a read-out integrated circuit 106, such as by electrically coupling conductive interconnects 202 of the optical detector 102 to electrical pathways or other electrical circuits of the read-out integrated circuit 106. This may also include mounting the read-out integrated circuit 106 on the platform 114.

One or more optical components are coupled to one or more flexures at step 1104, and the flexures are coupled to the optical detector at step 1106. This may include, for example, coupling one or more filters or other optical components 118 and the optical detector 102 to one or more flexures 122. As a particular example, this may include using adhesive to couple one or more filters or other optical components 118 and the optical detector 102 to one or more side surfaces 204, 802, 902, 1002 and/or one or more arms 206, 904 of one or more flexures 122. In this way, the one or more optical components 118 are mounted directly to the optical detector 102.

A cold shield is coupled to the platform at step 1108. This may include, for example, securing the cold shield 108 to the platform 114 around the optical detector 102 and the optical component(s) 118. This may also include centering the cold shield 108 around the optical detector 102 or otherwise ensuring that the aperture 110 of the cold shield 108 is positioned properly relative to the optical detector 102 so that incoming radiation 104 can pass through the aperture 110 and reach the optical detector 102. The platform contacts a cold finger of a cooling system at step 1110. This may include, for example, moving the optical detection system 100 into position so that the platform 114 contacts the cold finger 116.

Integration of the optical detection system into a larger device or system can be completed at step 1112. This may include, for example, placing the optical detection system 100 and the associated cooling system into a housing or other structure in which the optical detection system 100 and the associated cooling system will be placed into use. This may also include electrically coupling the read-out integrated circuit 106 to one or more analog-to-digital converters, signal processors, or other components that will be used to process signals generated by the optical detector 102 or the read-out integrated circuit 106.

Although FIG. 11 illustrates one example of a method 1100 for directly mounting one or more filters or other optical components 118 to an optical detector 102 using flexures 122, various changes may be made to FIG. 11. For example, while shown as a series of steps, various steps in FIG. 11 may overlap, occur in parallel, occur in a different order, or occur any number of times. As particular examples, the flexures 122 may be coupled to the optical detector 102 before at least one optical component 118 is coupled to the flexures 122, or the flexures 122 may be coupled to the optical detector 102 in between coupling the flexures 122 to different optical components 118a-118b.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   an optical detector configured to detect at least a portion of incoming radiation;
   an optical component configured to provide at least the portion of the incoming radiation to the optical detector; and
   at least one flexure that contacts and is coupled to the optical component and the optical detector and that directly mounts the optical component to the optical detector, each flexure configured to deform laterally in response to lateral expansion or contraction of at least one of the optical component and the optical detector.

2. The apparatus of claim 1, wherein each flexure is further configured to transfer heat from the optical component to the optical detector.

3. The apparatus of claim 1, wherein:
   the apparatus comprises multiple flexures; and
   different flexures are coupled to different sides of the optical detector and to different sides of the optical component.

4. The apparatus of claim 1, wherein each flexure comprises:
   a side surface that is flexible in a first dimension and rigid in second and third dimensions, the dimensions being orthogonal to each other; and
   arms projecting from the side surface, the arms configured to contact the optical component and the optical detector.

5. The apparatus of claim 1, wherein each flexure comprises a side surface that is flexible in a first dimension and rigid in second and third dimensions, the dimensions being orthogonal to each other, the side surface projecting inward to form shelves configured to contact the optical component and the optical detector.

6. The apparatus of claim 1, wherein each flexure comprises at least one notch in an outer face of the flexure.

7. The apparatus of claim 6, wherein each flexure comprises a conductive material partially or completely filling the at least one notch.

8. The apparatus of claim 1, wherein:
   the apparatus comprises multiple optical components; and
   the at least one flexure mounts the multiple optical components to the optical detector.

9. The apparatus of claim 1, wherein:
   the apparatus comprises multiple flexures, at least two of the flexures having different designs; and
   the multiple flexures mount the optical component to the optical detector such that the optical component has a specified tip or tilt relative to the optical detector.

10. The apparatus of claim 1, wherein the optical component comprises at least one of: a filter, a lens, a polarizer, an aperture, and a cover.

11. A system comprising:
    an optical detector configured to detect at least a portion of incoming radiation;
    an optical component configured to provide at least the portion of the incoming radiation to the optical detector;
    at least one flexure that contacts and is coupled to the optical component and the optical detector and that directly mounts the optical component to the optical detector, each flexure configured to deform laterally in response to lateral expansion or contraction of at least one of the optical component and the optical detector;
    a cold shield positioned around the optical detector and the optical component, the cold shield comprising an aperture through which the incoming radiation passes;
    a platform on which the cold shield is mounted; and
    a cold finger contacting the platform, the cold finger configured to be cooled in order to remove heat from the platform and thereby cool the optical detector, the optical component, and the cold shield.

12. The system of claim 11, further comprising:
    a read-out integrated circuit electrically coupled to the optical detector, the read-out integrated circuit mounted on the platform.

13. The system of claim 11, wherein the cold shield further comprises baffles configured to block stray radiation from striking the optical detector.

14. The system of claim 11, wherein each flexure comprises:
    a side surface that is flexible in a first dimension and rigid in second and third dimensions, the dimensions being orthogonal to each other; and
    arms projecting from the side surface, the arms configured to contact the optical component and the optical detector.

15. The system of claim 11, wherein each flexure comprises a side surface that is flexible in a first dimension and rigid in second and third dimensions, the dimensions being orthogonal to each other, the side surface projecting inward to form shelves configured to contact the optical component and the optical detector.

16. The system of claim 11, wherein:
    the system comprises multiple optical components; and
    the at least one flexure mounts the multiple optical components to the optical detector.

17. The system of claim 11, wherein:
    the system comprises multiple flexures, at least two of the flexures having different designs; and
    the multiple flexures mount the optical component to the optical detector such that the optical component has a specified tip or tilt relative to the optical detector.

18. A method comprising:
    directly mounting an optical component to an optical detector using at least one flexure that contacts and is coupled to the optical component and the optical detector, the optical detector configured to detect at least a portion of incoming radiation, the optical component configured to provide at least the portion of the incoming radiation to the optical detector;
    wherein each flexure is configured to deform laterally in response to lateral expansion or contraction of at least one of the optical component and the optical detector.

19. The method of claim 18, wherein each flexure is configured to deform in order to accommodate differences in coefficients of thermal expansion of the optical component and the optical detector.

20. The method of claim 18, wherein each flexure comprises a side surface that is flexible in a first dimension and rigid in second and third dimensions, the dimensions being orthogonal to each other.

21. The apparatus of claim 1, wherein each flexure is configured to deform laterally in a direction substantially parallel to at least one major surface of the optical detector or the optical component in response to the lateral expansion or contraction of at least one of the optical component and the optical detector.

22. The apparatus of claim 1, wherein the optical component is physically connected only to the optical detector by the at least one flexure and is not physically connected to any other component.

23. The apparatus of claim 8, wherein the optical components are physically connected only to each other and to the optical detector by the at least one flexure and are not physically connected to any other component.

* * * * *